United States Patent
Ziaei et al.

(10) Patent No.: US 8,096,131 B2
(45) Date of Patent: Jan. 17, 2012

(54) FUEL INLET WITH CRESCENT SHAPED PASSAGE FOR GAS TURBINE ENGINES

(75) Inventors: Reza Ziaei, Thornhill (CA); Eduardo Hawie, Woodbridge (CA)

(73) Assignee: Pratt & Whitney Canada Corp., Longueuil (CA)

( * ) Notice: Subject to any disclaimer, the term of this patent is extended or adjusted under 35 U.S.C. 154(b) by 917 days.

(21) Appl. No.: 11/984,220

(22) Filed: Nov. 14, 2007

(65) Prior Publication Data

US 2009/0120522 A1    May 14, 2009

(51) Int. Cl.
    *F02C 1/00*    (2006.01)
(52) U.S. Cl. .......................................... 60/739
(58) Field of Classification Search ............ 60/734, 60/735, 736, 739; 138/115; 137/561 A
    See application file for complete search history.

(56) References Cited

U.S. PATENT DOCUMENTS

| | | | |
|---|---|---|---|
| 2,690,648 A * | 10/1954 | Hiscox et al. ............ | 60/739 |
| 2,994,195 A * | 8/1961 | Carswell .................. | 60/39.35 |
| 3,213,523 A * | 10/1965 | Boehler .................... | 29/890.11 |
| 3,901,269 A | 8/1975 | Henderson | |
| 4,258,544 A | 3/1981 | Gebhart et al. | |
| 4,499,735 A * | 2/1985 | Moore et al. ............ | 60/739 |
| 4,735,044 A | 4/1988 | Richey et al. | |
| 4,754,782 A | 7/1988 | Grantham | |
| 4,887,425 A | 12/1989 | Vdoviak | |
| 4,922,971 A | 5/1990 | Grantham | |
| 5,056,489 A * | 10/1991 | Lorraine ................... | 123/468 |
| 5,211,341 A | 5/1993 | Wieczorek | |
| 5,265,652 A | 11/1993 | Brunella | |
| 5,450,884 A * | 9/1995 | Shih et al. ............... | 141/206 |
| 6,481,646 B1 | 11/2002 | Hornby | |
| 6,672,066 B2 | 1/2004 | Wrubel et al. | |
| 6,763,663 B2 * | 7/2004 | Mansour et al. ......... | 60/740 |
| 6,769,176 B2 | 8/2004 | Hornby | |
| 6,895,755 B2 | 5/2005 | Steinthorsson et al. | |
| 7,028,484 B2 * | 4/2006 | Prociw et al. ........... | 60/772 |
| 7,156,125 B2 * | 1/2007 | Martucci et al. ......... | 138/116 |
| 7,559,201 B2 * | 7/2009 | Prociw et al. ........... | 60/739 |
| 2004/0040306 A1* | 3/2004 | Prociw et al. ........... | 60/740 |
| 2005/0056332 A1* | 3/2005 | Martucci et al. ......... | 138/115 |
| 2005/0160738 A1* | 7/2005 | Fish et al. ............... | 60/776 |

* cited by examiner

*Primary Examiner* — Ehud Gartenberg
*Assistant Examiner* — Gerald Sung
(74) *Attorney, Agent, or Firm* — Norton Rose OR LLP

(57) ABSTRACT

An inlet tube within a gas turbine engine which includes a primary fuel channel and a secondary fuel channel formed in a cylindrical tube body. The secondary channel has a substantially crescent shaped cross-sectional area which is complementary in shape to the primary fuel channel, such as to maximize the combined fuel flow area through the primary and secondary fuel channels relative to an outer diameter of the cylindrical tube body.

21 Claims, 5 Drawing Sheets

FUEL INLET WITH CRESCENT SHAPED PASSAGE FOR GAS TURBINE ENGINES

TECHNICAL FIELD

The present invention relates generally to fuel systems for gas turbine engines, and more particularly to fuel inlet tubes thereof.

BACKGROUND OF THE INVENTION

Gas turbine engines include fuel systems of a number of kinds, which are fed fuel from a fuel source via internal inlet tubes or passages. Internal fuel manifolds make up part of one such fuel system, and are typically configured as a manifold ring having a fuel inlet tube attached thereto. The fuel inlet tube provides fuel flow into the ring portion of the internal fuel manifold via one or more fuel channels formed within the inlet tube. Gas turbine engine fuel inlet tubes are most commonly circular in cross-sectional shape, generally for ease of manufacturing and installation. In order to create two discrete fuel passages within such an inlet tube having a circular cross-section, two circular holes are typically drilled side-by-side within cylindrical stock material. It is common to have a primary and a secondary fuel passage, having different diameters. The diameters of the two fuel passages are determined based on several factors, including desired pressure drop and flow rate. However, when the fluid dynamic requirements force one or both of the two passages to be of a relatively large size, the overall diameter of the entire inlet tube must necessarily be increased accordingly in order to maintain acceptable wall thicknesses. This proves to be undesirable, given the tight space envelope available for the inlet tube within the engine.

SUMMARY OF THE INVENTION

It is an object to provide an improved fuel inlet for a gas turbine engine.

In accordance with one aspect of the present invention, there is provided a fuel inlet tube to a fuel conveying member of a fuel injection system in a gas turbine engine, the fuel inlet tube comprising a cylindrical tube body with a primary and a secondary fuel channel formed therein, the secondary fuel channel of the fuel inlet tube having a substantially crescent shaped cross-sectional area, the secondary fuel channel being complementary in shape to the primary fuel channel such as to maximize a combined fuel flow area through the primary and secondary fuel channels relative to an outer diameter of the cylindrical tube body.

There is also provided, in accordance with another aspect of the present invention, an inlet tube for supplying fuel in a fuel system of a gas turbine engine, the inlet tube comprising a cylindrical tube body having a primary channel and a secondary channel formed therein and providing independent fuel flow to respective first and second fuel conveying passages of a fuel conveying member of the fuel system, the primary channel of the inlet tube extending longitudinally through the tube body, the secondary channel of the inlet tube being adjacent and substantially parallel to the primary channel within the tube body, the secondary channel having a substantially crescent shaped cross-sectional area which is complementary in shape to the primary fuel channel such as to maximize the combined fuel flow area through the primary and secondary fuel channels relative to an outer diameter of the cylindrical tube body.

There is also provided, in accordance with another aspect of the present invention, a method of optimizing a outer diameter of a fuel inlet tube in a fuel system of gas turbine engine, comprising: determining a desired amount of fuel flow to be supplied through said fuel inlet tube; forming a fuel inlet tube having a cylindrical tube body with a primary and a secondary fuel channel therein, each of the primary and secondary fuel channels being disposed in independent fluid flow communication with fuel conveying passages of the fuel system; providing the secondary fuel channel of the fuel inlet tube with a substantially crescent shaped cross-sectional shape which faces toward and at least partially surrounds the primary fuel channel; and wherein the combined cross-sectional areas of the primary and secondary fuel channels provide said desired amount of fuel flow while minimizing the outer diameter of the fuel inlet tube.

There is further provided, in accordance with another aspect of the present invention, a method of manufacturing an internal fuel manifold for a gas turbine engine comprising: forming an annular fuel manifold ring having at least two fuel conveying passages therein; forming a cylindrical fuel inlet tube for the fuel manifold ring having at least a first and a second fuel conduit therein, including forming the second fuel conduit with a substantially kidney shaped cross-sectional shape which faces toward and at least partially surrounds the first fuel conduit, such as to maximize the fuel flow through the first and second fuel conduits without increasing the overall size of an outer diameter of the fuel inlet tube; and engaging the fuel inlet tube to the annular fuel manifold ring such that the first and second fuel conduits of the fuel inlet tube are disposed in respective fluid flow communication with the two fuel conveying passages of the annular fuel manifold ring.

BRIEF DESCRIPTION OF THE DRAWINGS

Further features and advantages of the present invention will become apparent from the following detailed description, taken in combination with the appended drawings, in which.

DETAILED DESCRIPTION OF A PREFERRED EMBODIMENT

Figure 1:
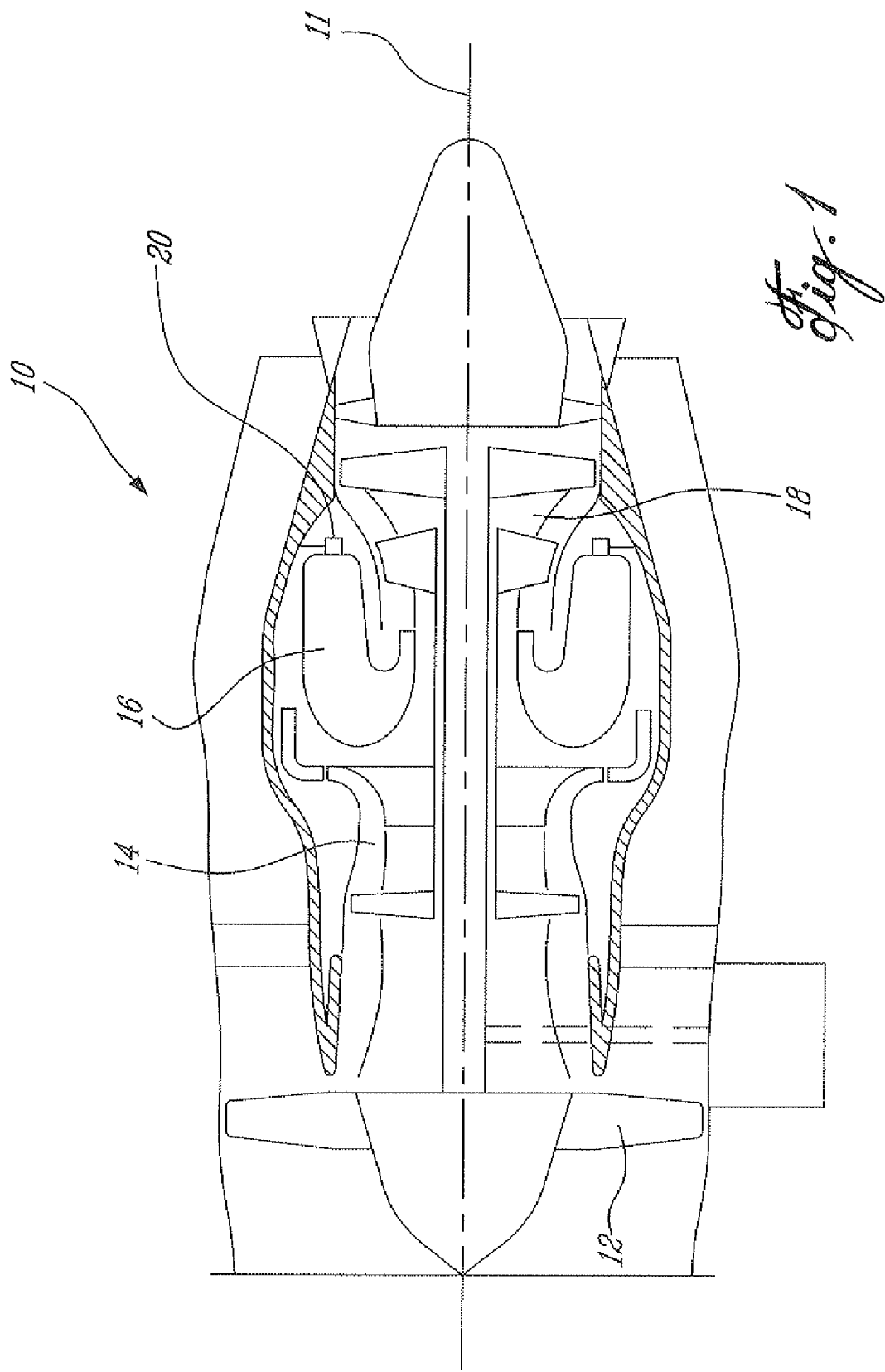
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
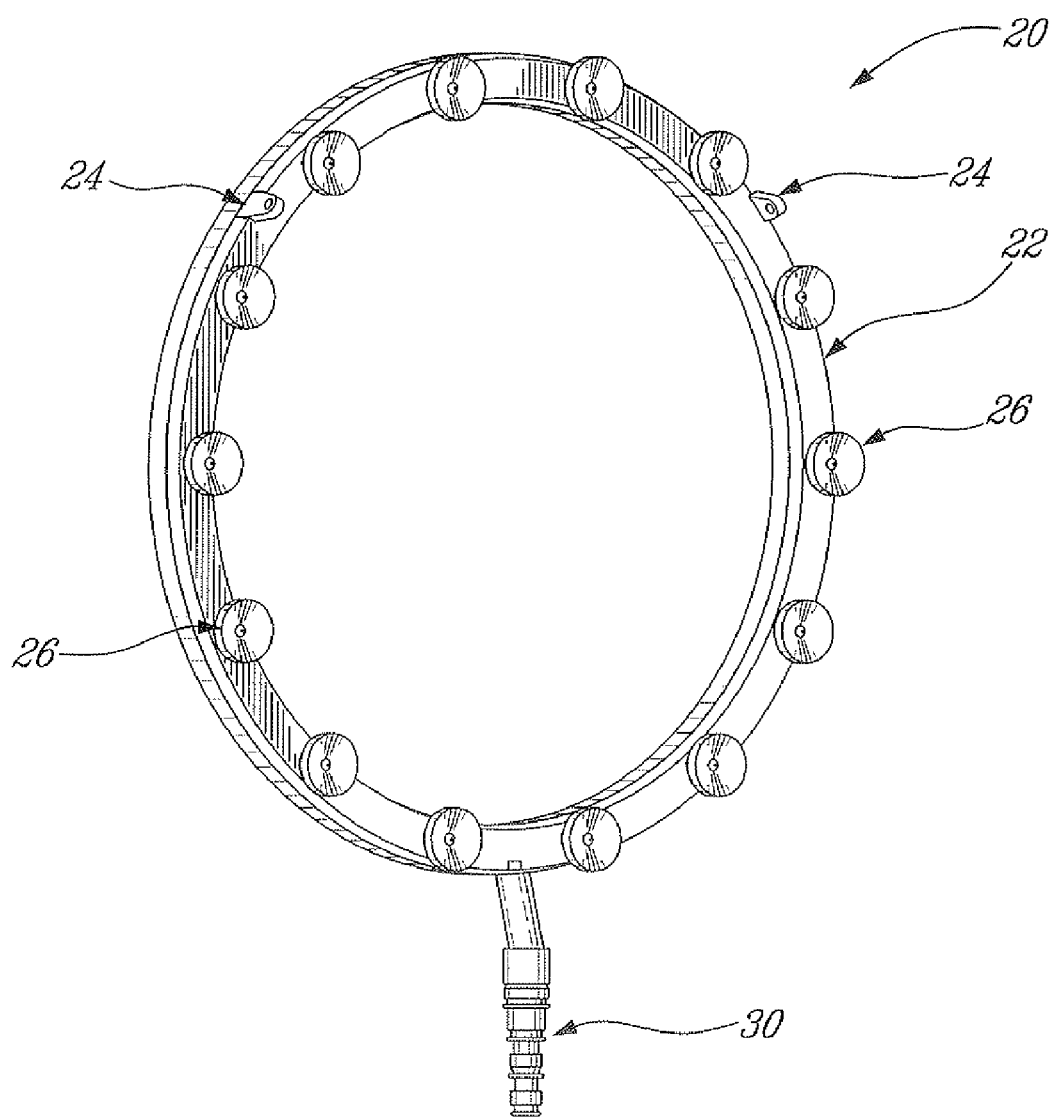
FIG. 2 is a perspective view of an internal fuel manifold incorporating a fuel inlet, for use in a gas turbine engine such as that depicted in FIG. 1.

Referring to FIG. 2, the fuel injection system 20 includes at least one fuel conveying member through which fuel flows and an inlet thereto. In the exemplary embodiment, the fuel injection system includes a fuel conveying member in the form of an annular fuel manifold ring 22 which is mounted adjacent to the combustor 16 in the gas turbine engine 10. The fuel manifold 22 is mounted within an inner gas generator casing of the engine by a suitable mounting system, which may or may not include at least partially the fuel inlet assembly 30, which will be described in further detail below. A pair of integral attachment lugs 24 which receive pins (not shown) may also comprise part of the mounting system for engaging the fuel manifold 22 of the fuel injection system within the engine. A plurality of fuel injecting nozzle assemblies 26 are provided about the circumference of the fuel manifold 22. The fuel nozzle assemblies 26 atomize the fuel as it is injected into the combustor for ignition when mixed with the compressed air therein. Fuel entering the annular fuel manifold 22 via the fuel inlet assembly 30 is distributed within the manifold 22, within one or more fuel passages, such that fuel flow is provided to each of the fuel nozzles assemblies 26. A manifold heat shield 29 may cover at least a portion of the manifold, and preferably encloses the inner fuel manifold ring 28 about substantially its entire circumference.

Figure 3:
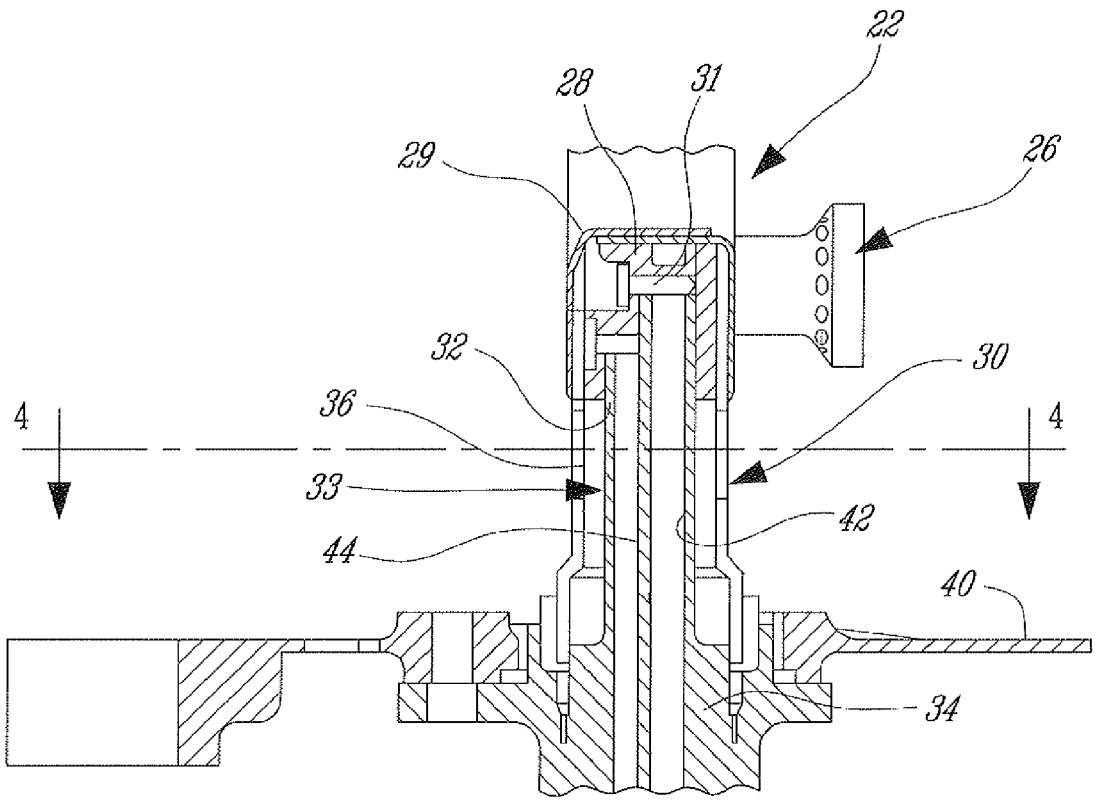
FIG. 3 is a cross-sectional view of the internal fuel manifold of FIG. 2 mounted within an engine casing, taken through the inlet.
Figure 4:
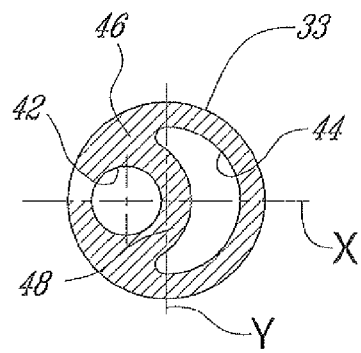
FIG. 4 is a transverse cross-sectional view of the internal fuel manifold inlet of FIG. 3, taken through line 4-4 of FIG. 3.
Figure 5:
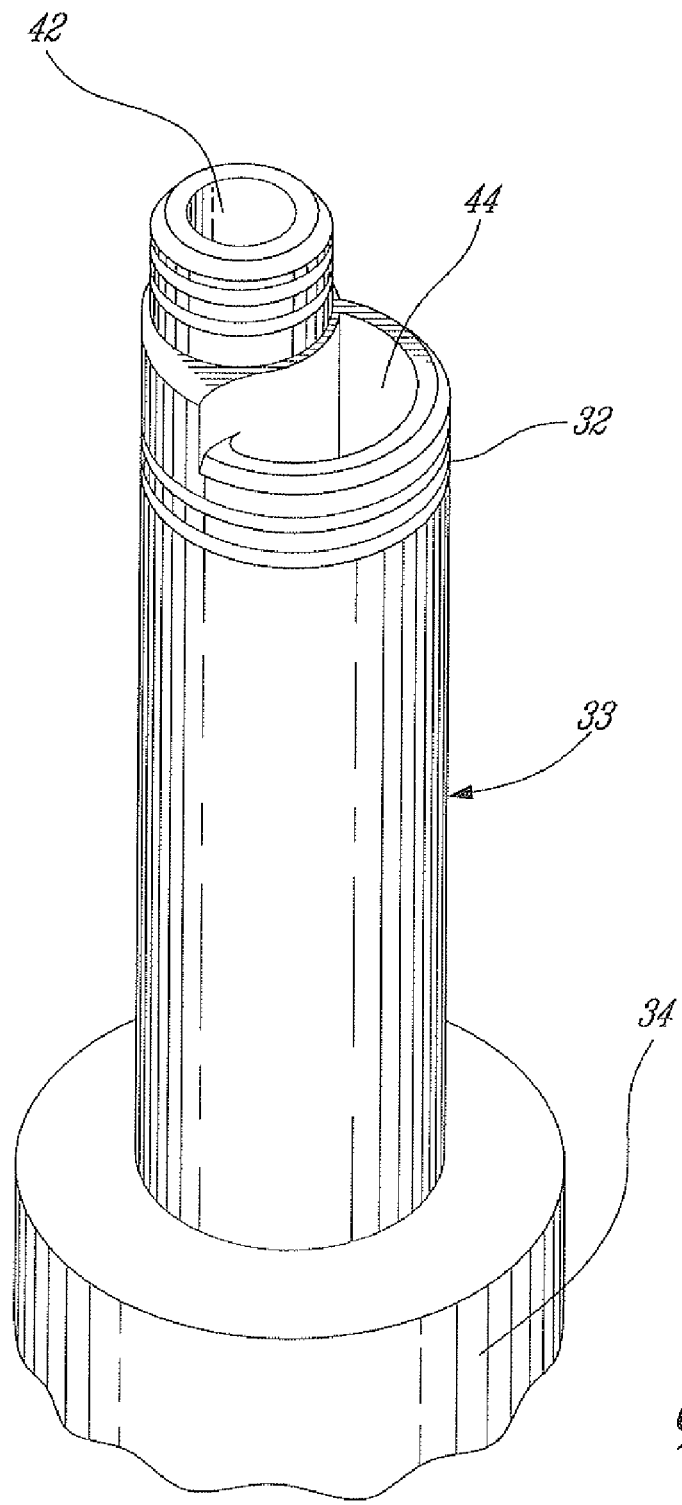
FIG. 5 is a perspective view of the inlet of FIG. 3 in isolation.

Referring now to FIGS. 3-5, the fuel manifold 22 includes the fuel manifold ring 28, defining a solid body within which at least one fuel conveying passage 31 is defined for fuel flow communication with the fuel nozzle assemblies 26, is enclosed within the manifold heat shield 29. In the present embodiment, two such fuel conveying passages 31 are provided in the fuel manifold ring 28, each one being fed fuel from a fuel source (not shown) via the fuel inlet assembly 30 having a radially inner distal end 32 engaged with the fuel manifold 22 and a radially outer proximal end 34 mounted within the supporting gas generator casing 40, in communication with the fuel source.

The fuel inlet assembly 30 generally includes an inner fuel inlet tube 33, through which fuel flows, and an outer fuel inlet heat shield 36 which surrounds the fuel inlet tube 33 along at least a portion of its length, preferably along the entire portion of its length that is exposed and extends between the gas generator casing 40 and the fuel manifold 22. The fuel inlet heat shield 36 thus helps protect the fuel inlet tube 33 of the fuel inlet assembly 30 against heat damage. Preferably, an air gap is defined between the fuel inlet tube 33 and the fuel inlet heat shield 36, which further acts as insulation to keep the fuel flowing through the fuel inlet tube 33 cooler. The fuel inlet heat shield 36 may be designed to be able to load bearing in order to at least partially support the internal fuel manifold 22. Although various overall shapes for the heat shield 36 are possible, the heat shield 36 is preferably generally tubular in shape.

The fuel inlet tube 33 includes a primary fuel passage or channel 42 and a secondary fuel passage or channel 44 disposed within the cylindrical tube body 46. Both primary and secondary channels 42, 44 extend longitudinally through the tube body 46 and are disposed adjacent to each other and remain substantially parallel to each other along their full length. In the embodiment of FIG. 4, the primary channel 42 of the fuel inlet tube 33 has a substantially circular cross-sectional shape, and this along at least a portion of its full length. The secondary channel 44 defines a substantially crescent-shaped cross-sectional area or shape, also along at least a portion of its full length. In one embodiment, both primary and secondary channels have a substantially constant cross-sectional shape and area along their full lengths through the tube body 46. The crescent-shaped secondary channel 44 may also be defined as a substantially kidney-shaped passage. The crescent-shaped secondary channel 44 opens towards the circular primary channel 42 (i.e. the inwardly curved or concave edge of the crescent-shaped channel is closest to the primary channel) and thus at least partially surrounds the primary channel.

The portion of the solid tube body 46 which forms the wall section 48 between the primary and secondary channels 42, 44 remains substantially of uniform thickness. The secondary channel 44 is, in at least one embodiment, larger in cross-sectional area than the primary channel 42. However, the cross-sectional area of the two channels may be substantially equal (as per in FIG. 8, for example, as will be described further below) or alternately still the primary channel may be larger in cross-sectional area than the secondary channel.

In the embodiment of FIG. 4, both the circular primary channel 42 and the crescent-shaped secondary channel 44 are substantially symmetrical about a first transverse axis X of the inlet tube body 46. In this embodiment, the primary and secondary channels 42 and 44 are disposed on opposite sides of a second transverse axis Y of the inlet tube body 46, the second transverse axis Y being perpendicular to the first transverse axis X.

Figure 6:
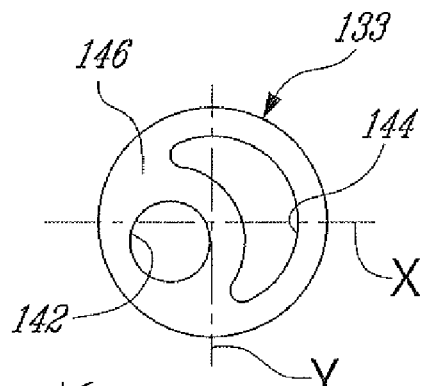
FIG. 6 is a transverse cross-sectional view of an internal fuel manifold inlet in accordance with an alternate embodiment.

However, one or both of the primary and secondary channels may also be offset from the first transverse axis X, rather than being symmetrical thereto. For example, in the embodiment of FIG. 6, the fuel inlet tube 133 includes a circular primary channel 142 within the tube body 146 that is offset from the first transverse axis X. In this embodiment, the crescent-shaped secondary channel 144 defines a cross-sectional shape that is asymmetric relative to the first transverse axis X. Alternately still, one or both of the two channels may be centered on the axis X, as per FIG. 4, but shaped such that the channel remains asymmetric relative thereto.

Figure 7:
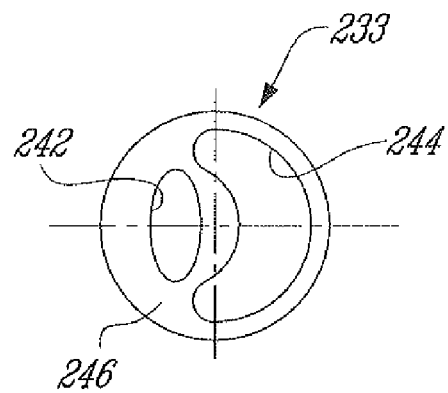
FIG. 7 is a transverse cross-sectional view of an internal fuel manifold inlet in accordance with another alternate embodiment.

In another alternate embodiment, such as depicted in FIG. 7, the primary channel 242 of the fuel inlet tube 233 can be substantially oval in cross-sectional shape, rather than being circular, while remaining complementary in shape to the substantially crescent-shaped secondary channel 244.

Figure 8:
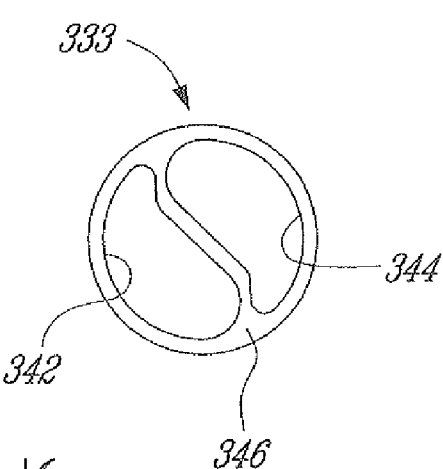
FIG. 8 is a transverse cross-sectional view of an internal fuel manifold inlet in accordance with yet another alternate embodiment.

Referring to FIG. 8, in yet another alternate configuration of the primary and secondary channels, a fuel inlet tube 333 which includes a primary channel 342 and a secondary channel 344 which are both substantially crescent-shaped. The primary and secondary channels 342 and 344 depicted in FIG. 8 are both substantially the same size (i.e. have substantially the same cross-sectional area), however it is to be understood that the primary channel 342 may be smaller in cross-sectional area as per the other embodiments described above.

Regardless of the particularly embodiment, the cross-sectional shape of the crescent-shaped secondary channel 44,144,244,344 as well as the combined relative configuration of the primary and secondary channels which correspond to each other such that the secondary channel 44,144,244,344 at least partially surrounds the primary channel 42,142,242, 342, therefore provides a dual-flow inlet tube 33,133,233,333 of the gas turbine internal fuel manifold that maximizes the amount of fuel which can be fed therethrough relative to the overall size (i.e. diameter) of the cylindrical tube body 46,146,246,346.

Thus, the overall size (e.g. outer diameter of the tube body) of the present dual-flow inlet tubes 33,133,233,333 for internal fuel manifolds is optimized, relative to the quantity of fuel able to be fed therethrough. This can be understood as follows. In typical prior art inlet tubes having two separate fuel passages, these passages either comprise two circular holes which are drilled side by side within a stock material or are alternately formed by two separate circular tubes which are placed together. In both cases, one hole or passage has a diameter D1 and the other has a diameter D2. The minimum size of the overall inlet tube is therefore D1+D2+3 T, where T is a minimum wall thickness between the passages. The sizes of the diameters are restricted by the desired fuel flows and pressure drops, and having two circular apertures side by side takes up significant space and requires wall thicknesses of a not insignificant amount. In contrast, in the present inlet tubes 33,133,233,333, at least one crescent shaped secondary channel is provided adjacent the primary channel, which may be circular, as shown in FIG. 4. This construction permits greater flexibility in terms of size and cross-sectional area of the fuel inlet passages within the inlet tube, without significant weight or space penalties.

Although the fuel inlet tube 33 is substantially straight in the embodiments of FIGS. 3 and 5, it is to be understood that the inlet tube can also include a bend, defined for example along a longitudinal axis of the tube that is perpendicular to a plan including central axes of the primary and secondary channels. This can be provided for a variety of reasons, such as in order to compensate for an offset between the fuel manifold and the casing or fuel source, for example.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A fuel inlet tube to an internal fuel manifold ring of a fuel injection system in a gas turbine engine, the internal fuel manifold ring being concentric with a longitudinal axis of the gas turbine engine and having at least two fuel conveying passages therein in fluid flow communication with a plurality of fuel injection nozzles adapted for spraying fuel into a combustor of the gas turbine engine, the fuel inlet tube comprising a solid cylindrical tube body having only two fuel channels formed therein, the two fuel channels being a primary and a secondary fuel channel, the primary and secondary fuel channels of the fuel inlet tube being connected in fluid flow communication with said at least two fuel conveying passages within the internal fuel manifold ring, the secondary fuel channel of the fuel inlet tube having a substantially crescent shaped cross-sectional area, the primary and secondary fuel channels intersecting at least a first transverse axis of the tube body which is substantially parallel to the longitudinal axis of the gas turbine engine, the secondary fuel channel being complementary in shape to the primary fuel channel such as to maximize a combined fuel flow area through the primary and secondary fuel channels relative to an outer diameter of the cylindrical tube body.

2. The fuel inlet tube as defined in claim 1, wherein each of the primary and secondary fuel channels of the fuel inlet tube being disposed in independent fluid flow communication with a respective one of the two fuel conveying passages of the fuel manifold ring.

3. The fuel inlet tube as defined in claim 1, wherein the secondary fuel channel includes a concave edge which faces toward the primary fuel channel.

4. The fuel inlet tube as defined in claim 1, wherein the secondary fuel channel at least partially surrounds the primary fuel channel.

5. The fuel inlet tube as defined in claim 1, wherein the secondary fuel channel has a greater cross-sectional area than the primary channel.

6. The fuel inlet tube as defined in claim 1, wherein the primary fuel channel has a substantially circular cross-sectional shape.

7. The fuel inlet tube as defined in claim 1, wherein the primary fuel channel has a substantially oval cross-sectional shape.

8. The fuel inlet tube as defined in claim 1, wherein the primary and secondary fuel channels have a substantially constant cross-sectional shape and area along their lengths.

9. The fuel inlet tube as defined in claim 1, wherein a portion of the tube body which forms a wall section defined between the primary and secondary fuel channels is of substantially uniform thickness.

10. The fuel inlet tube as defined in claim 1, wherein the primary and secondary fuel channels have a substantially equal cross-sectional area.

11. The fuel inlet tube as defined in claim 1, wherein the primary fuel channel and the secondary fuel channel are substantially symmetrical about the first transverse axis of the tube body.

12. The fuel inlet tube as defined in claim 11, wherein the primary fuel channel and the secondary fuel channel are disposed on opposite sides of a second transverse axis of the tube body, the second transverse axis being perpendicular to the first transverse axis.

13. The fuel inlet tube as defined in claim 1, wherein at least one of the primary fuel channel and the secondary fuel channel is offset from the first transverse axis.

14. The fuel inlet tube as defined in claim 1, wherein the secondary fuel channel defines a cross-sectional shape that is asymmetric relative to a first transverse axis of the tube body.

15. The fuel inlet tube as defined in claim 1, wherein the primary fuel channel is substantially crescent-shaped.

16. A fuel system of a gas turbine engine comprising an internal fuel manifold ring concentric with a longitudinal axis of the gas turbine engine and an inlet tube for supplying fuel to the internal fuel manifold ring, the inlet tube having a solid cylindrical tube body defining only two fuel channels, the two fuel channels being a primary channel and a secondary channel providing independent fuel flow to respective first and second fuel conveying passages of the internal fuel manifold ring, the primary channel of the inlet tube extending longitudinally through the tube body, the secondary channel of the inlet tube being adjacent and substantially parallel to the primary channel within the tube body, the primary and secondary fuel channels intersecting at least a first transverse axis of the tube body which is substantially parallel to the longitudinal axis of the gas turbine engine, the secondary channel having a substantially crescent shaped cross-sectional area which is complementary in shape to the primary fuel channel such as to maximize the combined fuel flow area through the primary and secondary fuel channels relative to an outer diameter of the cylindrical tube body.

17. The inlet tube as defined in claim 16, wherein the secondary fuel channel at least partially surrounds the primary fuel channel.

18. The inlet tube as defined in claim 16, wherein the primary fuel channel and the secondary fuel channel are substantially symmetrical about the first transverse axis of the tube body.

19. The inlet tube as defined in claim 18, wherein the primary fuel channel and the secondary fuel channel are disposed on opposite sides of a second transverse axis of the tube body, the second transverse axis being perpendicular to the first transverse axis.

20. The inlet tube as defined in claim 16, wherein at least one of the primary fuel channel and the secondary fuel channel is offset from to a first transverse axis of the tube body.

21. The inlet tube as defined in claim 16, wherein the secondary fuel channel defines a cross-sectional shape that is asymmetric relative to a first transverse axis of the tube body.

* * * * *